United States Patent
Ruttenberg et al.

(10) Patent No.: US 7,065,586 B2
(45) Date of Patent: Jun. 20, 2006

(54) SYSTEM AND METHOD FOR SCHEDULING AND EXECUTING DATA TRANSFERS OVER A NETWORK

(75) Inventors: John C. Ruttenberg, Waban, MA (US); Walter D. Lichtenstein, Belmont, MA (US); David Agraz, Philadelphia, PA (US); Fouad A. Tobagi, Los Altos, CA (US); Ashfaq A. Munshi, Los Altos, CA (US); David Lemke, Mountain View, CA (US)

(73) Assignee: Radiance Technologies, Inc., Los Altos, CA (US)

(*) Notice: Subject to any disclaimer, the term of this patent is extended or adjusted under 35 U.S.C. 154(b) by 855 days.

(21) Appl. No.: 09/935,016

(22) Filed: Aug. 21, 2001

(65) Prior Publication Data

US 2002/0083185 A1    Jun. 27, 2002

Related U.S. Application Data

(60) Provisional application No. 60/257,654, filed on Dec. 22, 2000.

(51) Int. Cl.
*G06F 15/13* (2006.01)
(52) U.S. Cl. .................. 709/244; 370/230; 370/412; 379/242
(58) Field of Classification Search ............. 709/244; 370/230, 412; 379/242
See application file for complete search history.

(56) References Cited

U.S. PATENT DOCUMENTS

| | | |
|---|---|---|
| 4,642,758 A | 2/1987 | Teng |
| 4,644,463 A | 2/1987 | Hotchkin et al. |
| 5,523,854 A | 6/1996 | Hornsby |
| 5,557,320 A | 9/1996 | Krebs |
| 5,708,960 A | 1/1998 | Kamisaka et al. |
| 5,886,793 A | 3/1999 | Satou |
| 5,920,700 A | 7/1999 | Gordon et al. |
| 5,920,701 A | 7/1999 | Miller et al. |
| 5,933,413 A | 8/1999 | Merchant et al. |
| 5,933,603 A | 8/1999 | Vahalia et al. |
| 5,978,363 A | 11/1999 | Dimitrijevic et al. |
| 6,003,082 A | 12/1999 | Gampper et al. |
| 6,026,097 A | 2/2000 | Voois et al. |
| 6,038,216 A | 3/2000 | Packer |
| 6,052,710 A | 4/2000 | Saliba et al. |
| 6,052,734 A | 4/2000 | Ito et al. |
| 6,070,191 A | 5/2000 | Narendran et al. |
| 6,098,064 A | 8/2000 | Pirolli et al. |
| 6,098,096 A | 8/2000 | Tsirigotis et al. |

(Continued)

OTHER PUBLICATIONS

U.S. Appl. No. 09/853,816, Tobagi et al.

(Continued)

*Primary Examiner*—John Follansbee
*Assistant Examiner*—Jinsong Hu
(74) *Attorney, Agent, or Firm*—Carr & Ferrell LLP

(57) ABSTRACT

A system and method for scheduling transfers of data through a network, the system comprising a transfer module at each node in the network, the transfer module being configured to schedule data transfers according to available resources at each node. In one embodiment, the transfer module includes a scheduling module, a routing module, and an execution module. The scheduling module at each node evaluates a single hop request in view of objectives, such as a deadline, and the available resources at that node, for example transmit bandwidth, receive bandwidth, and storage space, all of which may change as a function of time.

3 Claims, 10 Drawing Sheets

U.S. PATENT DOCUMENTS

| | | |
|---|---|---|
| 6,134,584 A | 10/2000 | Chang et al. |
| 6,134,596 A | 10/2000 | Bolosky et al. |
| 6,141,754 A | 10/2000 | Choy |
| 6,208,661 B1 * | 3/2001 | Marshall ............... 370/412 |
| 6,240,460 B1 | 5/2001 | Mitsutake et al. |
| 6,324,570 B1 | 11/2001 | Tonchev et al. |
| 6,332,023 B1 * | 12/2001 | Porter et al. ............ 379/242 |
| 6,337,850 B1 * | 1/2002 | Nakano et al. .......... 370/230 |
| 6,374,336 B1 | 4/2002 | Peters et al. |
| 6,397,251 B1 | 5/2002 | Graf |
| 6,427,140 B1 | 7/2002 | Ginter et al. |
| 6,560,651 B1 | 5/2003 | Katz et al. |
| 6,657,954 B1 | 12/2003 | Bird et al. |
| 6,715,007 B1 | 3/2004 | Williams et al. |
| 6,741,563 B1 | 5/2004 | Packer |
| 6,748,447 B1 * | 6/2004 | Basani et al. ............ 709/244 |
| 6,754,200 B1 | 6/2004 | Nishimura et al. |
| 6,771,603 B1 | 8/2004 | Yi et al. |
| 6,775,665 B1 | 8/2004 | Piersol |
| 6,798,787 B1 | 9/2004 | Kukuchi et al. |
| 6,813,244 B1 | 11/2004 | He et al. |
| 2002/0002618 A1 | 1/2002 | Vange |
| 2002/0080721 A1 | 6/2002 | Tobagi et al. |
| 2004/0022191 A1 * | 2/2004 | Bernet et al. ............ 370/230 |
| 2004/0071085 A1 | 4/2004 | Shaham et al. |
| 2004/0114607 A1 | 6/2004 | Shay et al. |

OTHER PUBLICATIONS

U.S. Appl. No. 09/852,464, Milkey et al.

* cited by examiner

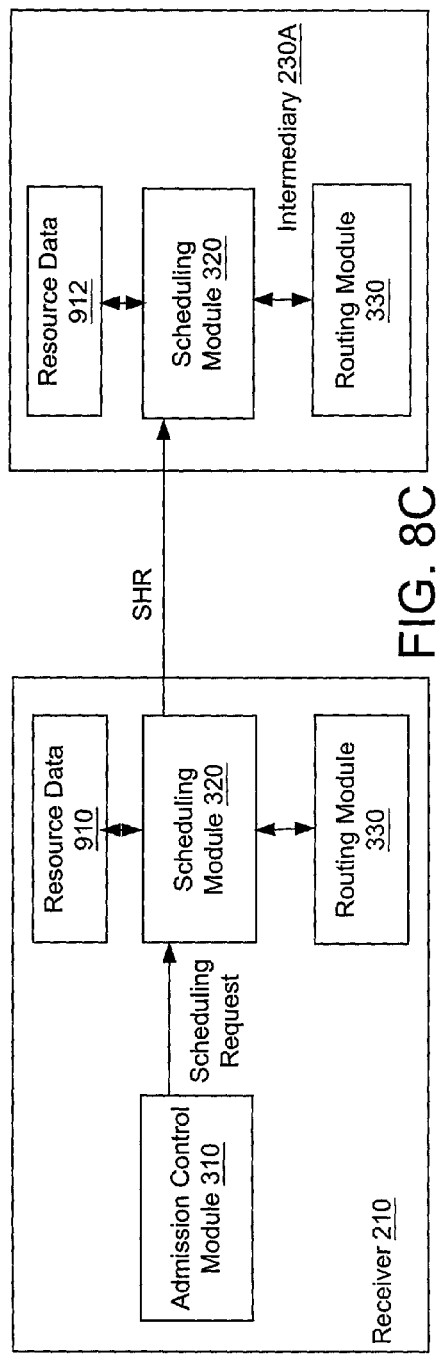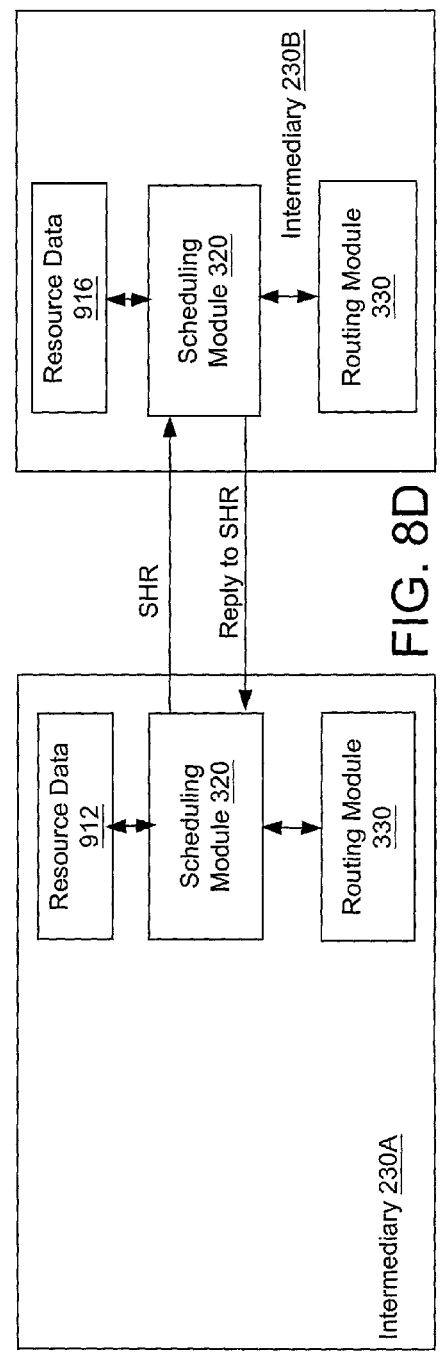

SYSTEM AND METHOD FOR SCHEDULING AND EXECUTING DATA TRANSFERS OVER A NETWORK

CROSS-REFERENCE TO RELATED APPLICATIONS

This application is related to, and claims the priority benefit of, U.S. provisional patent application No. 60/257,654, entitled "System and Method for Scheduling Data Transfers Through a Network," filed Dec. 22, 2000, the subject matter of which is hereby incorporated by reference. This application is also related to U.S. patent application Ser. No. 09/853,816, entitled "System and Method for Controlling Data Transfer Rates on a Network," filed May 11, 2001, and to U.S. patent application Ser. No. 09/852,464, entitled "System for Automated and Optimized File Transfers Among Computers over a Network," filed May 9, 2001. The related applications are commonly assigned and are hereby incorporated by reference.

BACKGROUND OF THE INVENTION

1. Field of the Invention

The invention relates to electronic communication networks and more particularly to a system and method for scheduling and executing data transfers over these networks.

2. Background Information

As illustrated in prior art FIG. 1, a communication network 100 includes devices such as receivers 110, senders 120, and intermediaries 150 connected through communication channels 130 to a network 140. In some embodiments, receiver 110 and sender 120 are a network client and network server respectively. Intermediary 150 serves as a transmission node between various parts of communication network 100 and optionally includes a local storage 160 capable of storing data.

Communication between the devices in communication network 100 is typically managed using a series of software and hardware systems. Data is often transferred using standards such as TCP (Transmission Control Protocol) over IP (Internet Protocol). Each device and communication channel 130 has limited bandwidth and storage capacities. When these resources are shared by multiple parties the available bandwidth and storage space can vary dynamically.

Typical data transfers occur directly after a request from receiver 110. A user at receiver 110 requests a transfer of data, for example a software program, from sender 120 via a website. Sender 120 then begins sending the requested data directly after receipt of the request, with no consideration of available resources at receiver 110. For example, the user at receiver 110 is responsible for determining that there is adequate storage space at receiver 110 for the requested data. In addition, the user at receiver 110 typically does not have accurate a priori knowledge of how much time is needed to complete the data transfer. Any time estimate provided by sender 120 usually only reflects the size of the data file, and does not take into account any bandwidth limitations at sender 120, receiver 110, or elsewhere in network 140.

SUMMARY OF THE INVENTION

A system for scheduling data transfers through a communication network includes a node configured to send data, a node configured to receive data, and a transfer module at each node configured to evaluate a data transfer request in view of satisfying objectives in accordance with resources at each node. The objectives include a deadline for delivery of data to the node configured to receive data and minimizing the cost of delivery of the data. The resources at each node include receive bandwidth, transmit bandwidth, and available storage space. The values of the resources vary as a function of time. In one embodiment, the system further includes a node configured to send and to receive data.

In one embodiment, the transfer module includes an admission control module, a scheduling module, a routing module, an execution module, a slack module, a padding module, a priority module, and an error recovery module. Other embodiments of the transfer module include some combination of the above modules. For example, an instance of the transfer module at a sender includes the scheduling module, the execution module, the slack module, the padding module, and the error recovery module. In one embodiment, the admission control module includes a soft rejection routine that includes a waiting list. In one embodiment, the scheduling module includes a preemption module and a feasibility test, and in another embodiment, the scheduling module includes a preemption module and an explicit scheduling routine.

In one embodiment of the invention, a central control node evaluates data transfer requests in view of satisfying objectives in accordance with resources at each node. The central control node includes a transfer module which is configured to interrogate each node to determine that node's resources such as bandwidth and storage space. The transfer module of the central control node manages the execution of scheduled data transfers between nodes and dynamic requests.

BRIEF DESCRIPTION OF THE DRAWINGS

FIG. 8C is a diagram of further processing of a request for a data transfer according to one embodiment of the invention;

FIG. 8D is a diagram of further processing of a request for a data transfer according to one embodiment of the invention.

DETAILED DESCRIPTION OF THE DRAWINGS

Figure 1:
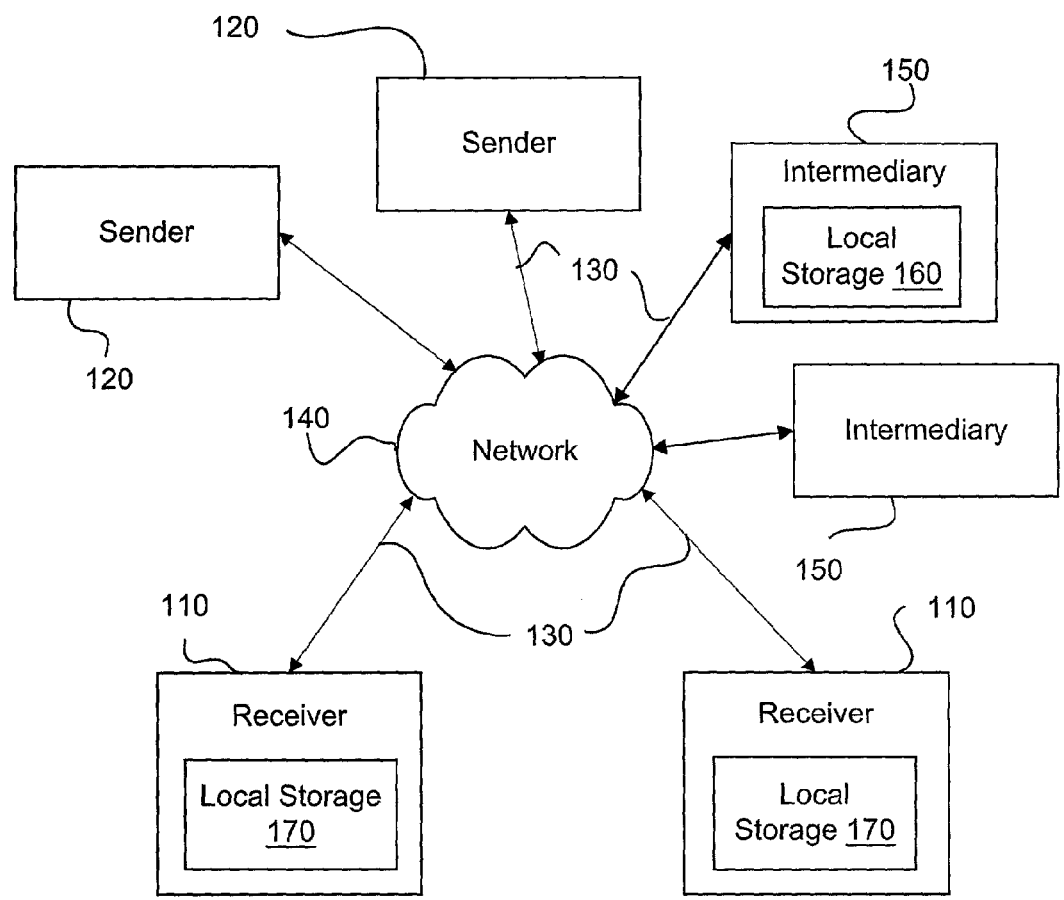
FIG. 1 is a block diagram illustrating a prior art communication network.
Figure 2:
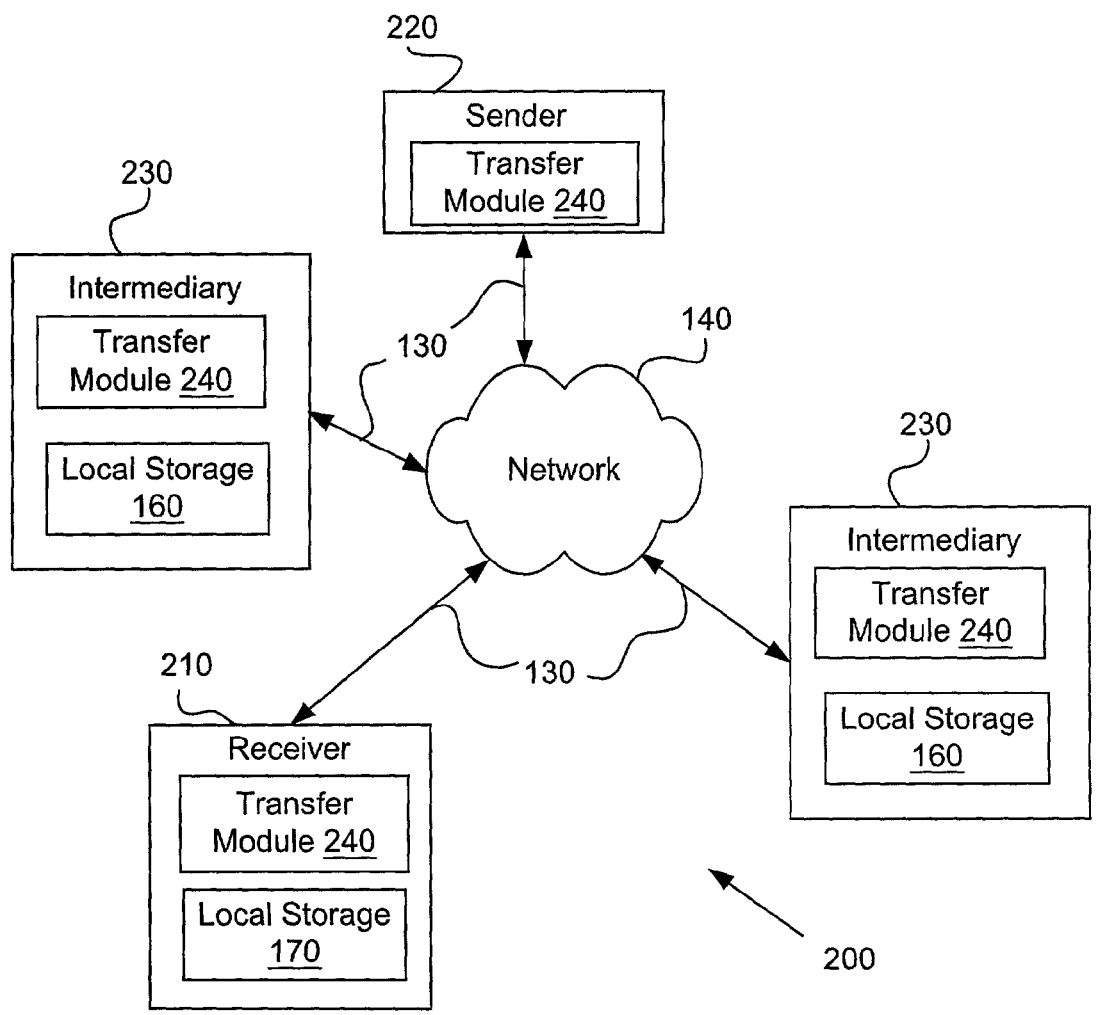
FIG. 2 is a block diagram of one embodiment of a communication network according to the invention.

FIG. 2 is a block diagram of a communication network 200 according to one embodiment of the invention. Communication network 200 includes a receiver 210, a sender 220, and intermediaries 230, each coupled via a path 230 to network 140. Receiver 210 is a computing device, such as a general purpose computer, a set-top box, or an Internet appliance, and includes a local storage 170. Sender 220 is a computing device, such as a web server or other appropriate electronic networking device. Intermediary 230 is a computing device, such as a server, that includes local storage 160 for storage of data. Receiver 210, sender 220, and intermediaries 230 each include embodiments of a transfer module 240. The contents and functionality of transfer module 240 is discussed below in conjunction with FIGS. 3–7C.

Receiver 210, intermediaries 230, and sender 220 communicate via network 140. In various embodiments, network 140 is a local area network (LAN), a wide area network (WAN), a wireless network, the Internet, or a combination thereof. In a typical data transfer from sender 220 to receiver 210, data passes through network 140 and optionally one or more intermediaries 230 before arriving at receiver 210, which stores the data in local storage 170. The data can include a variety of information such as text, graphics, video, and audio. In one embodiment, sender 220 directs receiver 210 to request data from intermediary 230, which in turn obtains the data from sender 220, and stores a copy of the data in local storage 160 before sending the data to receiver 210.

Transfer module 240 at each node evaluates a data transfer request in view of satisfying various objectives, for example meeting a deadline for completion of the transfer, minimizing the cost of bandwidth, a combination of these two objectives, or any other appropriate objectives. In one embodiment, transfer module 240 evaluates a data transfer request using known and estimated bandwidths at each node and known and estimated storage space at receiver 210 and intermediaries 230. Transfer module 240 rejects (denies) a data transfer request if known storage space and bandwidth limits suggest that a deadline for the data transfer may not be achieved or other objectives cannot be met.

Transfer module 240 manages requests for data considering that the data requested can be located at a variety of nodes, that each node connected to communication network 200 has estimated or known amounts of receive and transmit bandwidths, that each local storage 170 and each local storage 160 has limited amounts of storage space, and that these conditions change as a function of time. Transfer module 240 is responsive to transmit bandwidth available at the sender and receive bandwidth available at the receiver. Transfer module 240 may also be responsive to a priority assigned to the data transfer. Data transfer requests are satisfied by transferring data directly from sender 220 to receiver 210, or indirectly by a sequence of transfers from the original location through one or more intermediaries 230 and then to receiver 210. Data transfer requests are also satisfied by delivering a copy of the requested data previously stored in local storage 160 of intermediary 230.

When a data transfer includes one or more intermediaries 230, transfer module 240 optionally decomposes the data transfer into a sequence of intermediate data transfer steps. For example, a data transfer from sender 220, through intermediary 230, to receiver 210 is accomplished by first completely transferring the data to intermediary 230, and then transferring the data from intermediary 230 to receiver 210. Alternatively, the transfer from intermediary 230 to receiver 210 begins before the transfer from sender 220 to intermediary 230 is complete. The first case is called "store-and-forward routing," while the second case is called "flow-through routing." For scheduling purposes the difference between store-and-forward routing and flow-through routing is that flow-through routing requires a generalization of the notion of a deadline. In store-and-forward routing, the transfer from sender 220 to intermediary 230 has a deadline (must be completed) before the time at which the transfer from intermediary 230 to receiver 210 starts. In flow-through routing, each byte or data packet of the data must be transferred from sender 220 to intermediary 230 before it can be transferred from intermediary 230 to receiver 210. Thus, the deadline condition for the transfer of data from sender 220 to intermediary 230 is that this part of the transfer must always be further along than the transfer from intermediary 230 to receiver 210.

Figure 3:
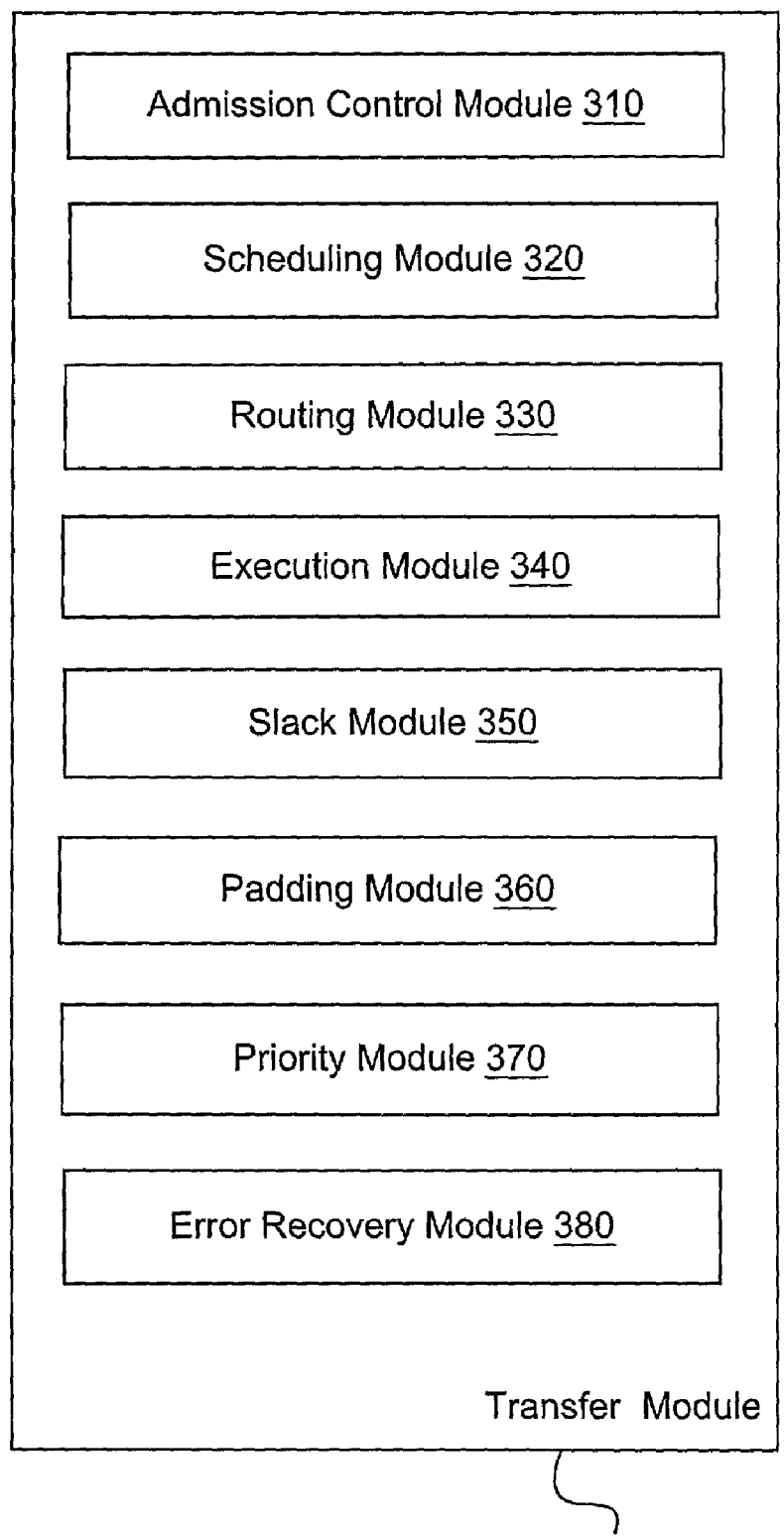
FIG. 3 is a block diagram of one embodiment of the scheduling module of FIG. 2, according to the invention.
Figure 4:
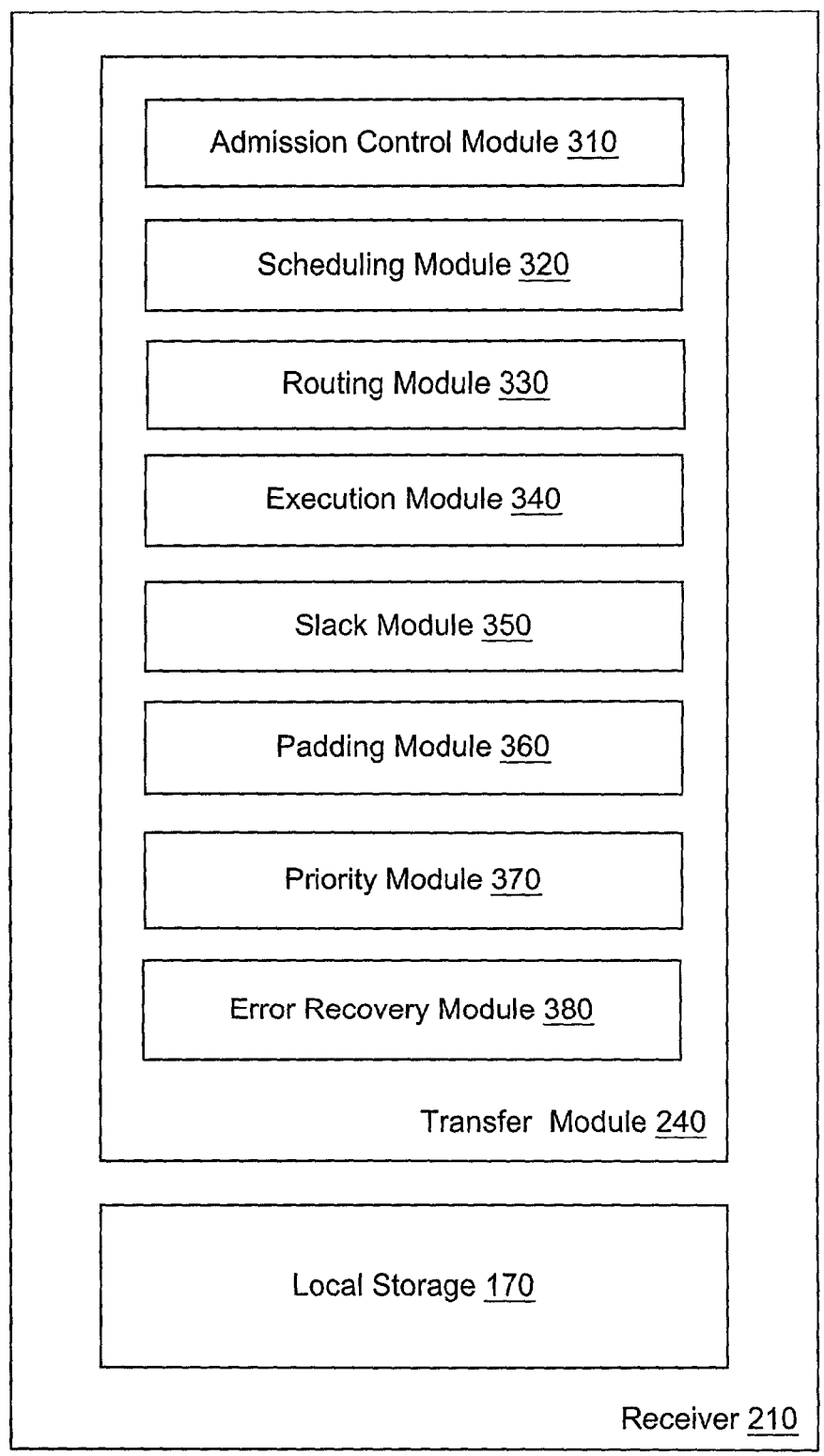
FIG. 4 is a block diagram of an embodiment of the scheduling module of the receiver of FIG. 2, according to the invention.
Figure 5:
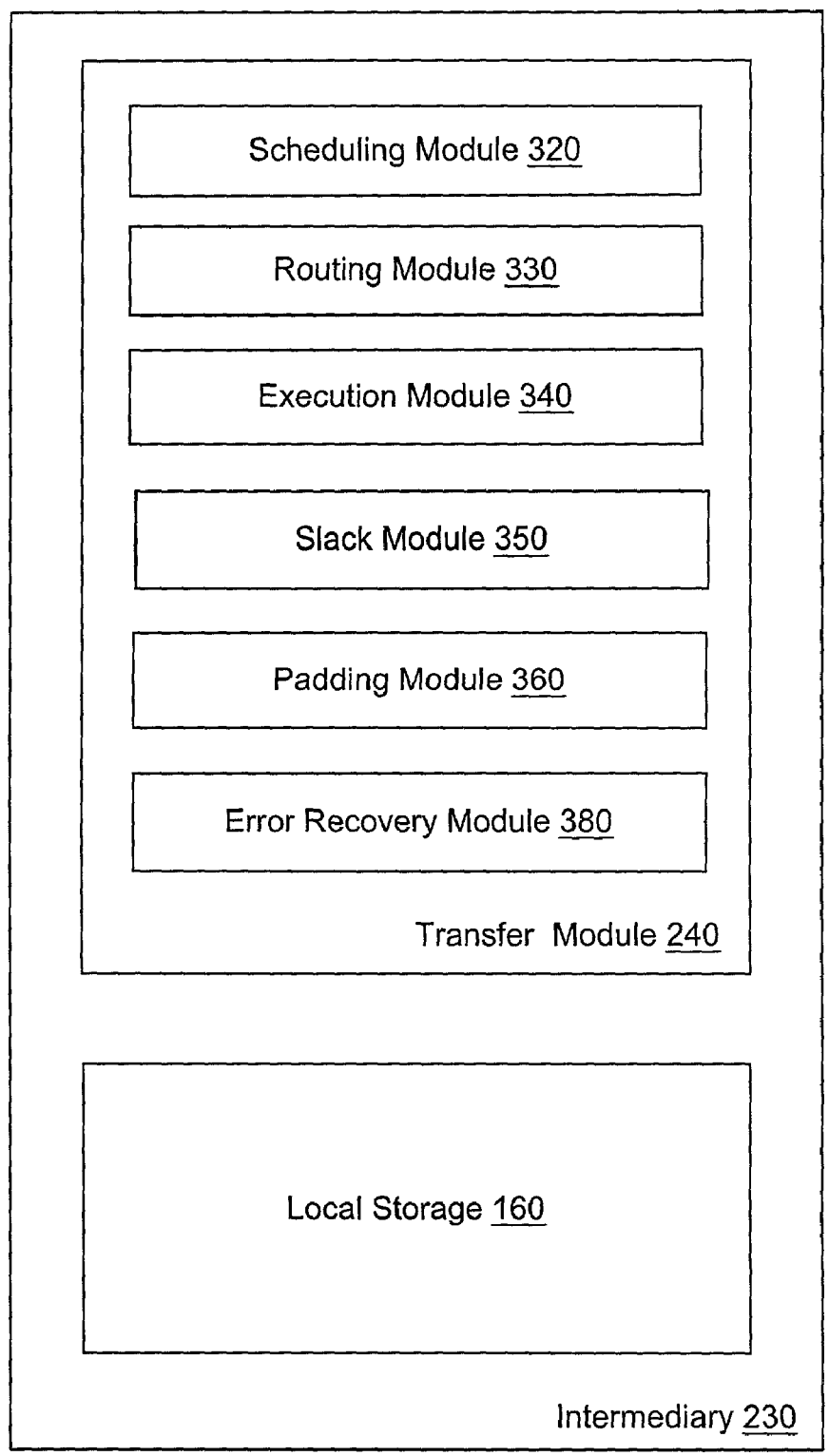
FIG. 5 is a block diagram of an embodiment of the scheduling module of the intermediary of FIG. 2, according to the invention.
Figure 6:
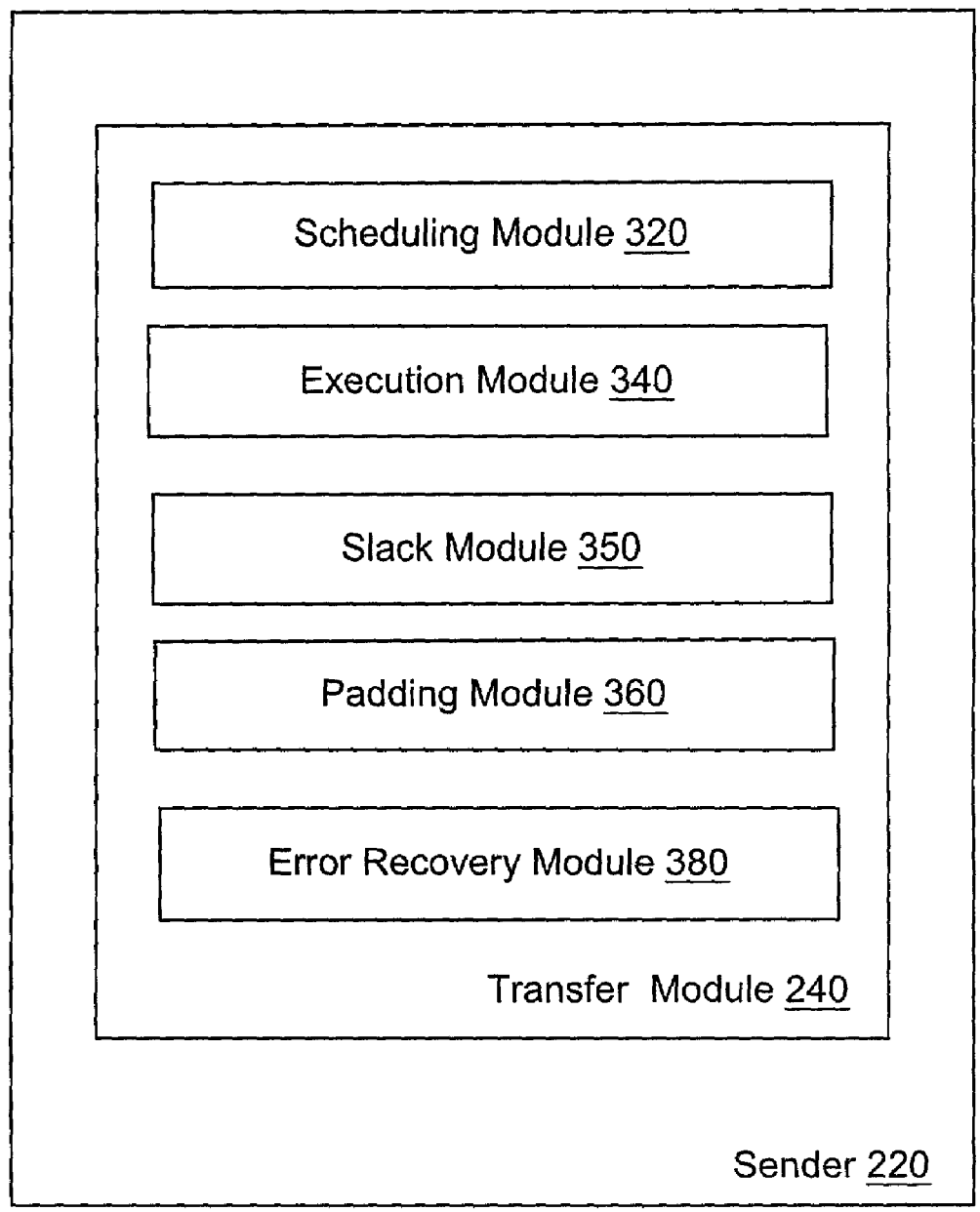
FIG. 6 is a block diagram of an embodiment of the scheduling module of the sender of FIG. 2, according to the invention.

FIG. 3 is a block diagram of one embodiment of transfer module 240, in accordance with the invention. Transfer module 240 includes, but is not limited to, an admission control module 310, a scheduling module 320, a routing module 330, an execution module 340, a slack module 350, a padding module 360, a priority module 370, and an error recovery module 380. Several of these modules are optional depending on the location and use of each embodiment of transfer module 240. For example, in an embodiment of transfer module 240 located on sender 220, only scheduling module 320, execution module 340, slack module 350, padding module 360, and error recovery module 380 are included. FIGS. 4 through 6 illustrate other embodiments of transfer module 240.

Admission control module 310 receives requests for data transfers from a user, determines the feasibility of the requested transfers in view of various objectives, and accepts or denies each request. Admission control module 310 queries routing module 330 to identify possible sources of the requested data. Scheduling module 320 evaluates the feasibility of a transfer from each of the sources identified by routing module 330 and reports back to admission control module 310. Execution module 340 manages accepted data transfers and works with other modules to compensate for unexpected events that occur during a data transfer. Execution module 340 operates under the guidance of scheduling module 320, but also responds to dynamic conditions that are not under the control of scheduling module 320. Slack module 350 uses statistical estimates and historical performance data to determine an amount of available resources that should be uncommitted (reserved) in anticipation of differences between actual (measured) and estimated transmission times. Padding module 360 uses statistical models to determine how close to deadlines transfer module 240 should attempt to complete transfers. Priority module 370 determines which transfers should be allowed to preempt other transfers. Preemption is based on priorities given by users, deadlines, confidence of transfer time estimates, or other appropriate criteria. Error recovery module 380 assures that the operations controlled by transfer module 240 can be returned to a consistent state if an unanticipated event occurs. The functionalities of the modules of transfer module 240 are further discussed below.

Admission control module 310 receives a data transfer request from an end user and converts the data transfer request into one or more store-and-forward requests or scheduling requests. Scheduling module 320, in conjunction with routing module 330, evaluates each scheduling request and prepares one or more single hop requests. Scheduling module 320 sends a single hop request to a data source identified by routing module 330, and the data source replies to the single hop request with an acceptance or a denial. Scheduling module 320 reports the responses to the single hop requests to admission control module 310, which either rejects or accepts the data transfer request based on the results reported by scheduling module 320.

When a data transfer request is rejected, admission control module 310 can simply inform the requester that the request is not accepted, or optionally provide one of several types of soft rejections. If admission control module 310 does not provide a soft rejection, the user has to determine how to modify the original request so that it will be accepted. If admission control module 310 does provide a soft rejection, the soft rejection suggests a later deadline, higher priority, or a later time at which the original request should be resubmitted. A suggestion for a later deadline is optionally accompanied by an offer of waiting list status for the original deadline. Admission control module 310 and scheduling module 320 also operate during the transfer of data, which is desirable because unexpected events may require that alternate sources be found. If this occurs, scheduling module 320 sends single hop requests to alternative sources and, if required, admission control module 310 notifies the requester of the possibility of a transfer completing after a deadline.

Scheduling module 320 uses a variety of information for processing a data transfer request including, for example, the location of receiver 210, the requested data (file) to be transferred, the size of the requested data, the original location of the requested data, locations of alternative copies of the requested data, the deadline for data arrival at receiver 210, total available resources, and resources already committed to other transfers. Scheduling module 320 responds to scheduling requests from admission control module 310 with an acceptance or a rejection. If the response is an acceptance, then resources are reserved at nodes (sender 220, intermediary 230, or receiver 210) required to transfer the file to receiver 210.

Scheduling module 320 compares the probability that the transfer will be completed before a deadline with a minimum probability value when determining if a single hop request should be accepted. The minimum probability value is a parameter that can be set by a user at a node or a manager of the communication network 200 and is optionally a function of priority. Implementations with relatively weak admission control tests and/or more support for preemption, provide a lower probability of meeting a deadline but an increased probability that a transfer request will be accepted. Weaker admission control tests can optionally delay routing decisions until just before the transfer is executed. In contrast, implementations with relatively strong admission control tests and/or less allowance for preemption, provide a higher probability of meeting a deadline. Strong admission control tests require that routing be determined at the time the data transfer is accepted by scheduling module 320, so that resource reservations can be made at all nodes involved in the transfer.

FIG. 4 is a block diagram of one embodiment of transfer module 240 found on receiver 210. The FIG. 4 embodiment of transfer module 240 includes, but is not limited to, an admission control module 310, scheduling module 320, routing module 330, execution module 340, slack module 350, padding module 360, priority module 370, and error recovery module 380.

FIG. 5 is a block diagram of one embodiment of transfer module 240 found on intermediary 230. The FIG. 5 embodiment of transfer module 240 includes, but is not limited to, scheduling module 320, routing module 330, execution module 340, slack module 350, padding module 360, and error recovery module 380.

FIG. 6 is a block diagram of one embodiment of transfer module 240 found on sender 220. The FIG. 6 embodiment of transfer module 240 includes, but is not limited to, scheduling module 320, execution module 340, slack module 350, padding module 360, and error recovery module 380.

Although FIGS. 4 through 6 show embodiments of transfer module 240 on receiver 210, intermediary 230, and sender 220, the roles of these three devices or nodes can change. For example, in one data transfer a specific computing device acts as intermediary 230 while in another data transfer the same device acts as sender 220.

Figure 7A:
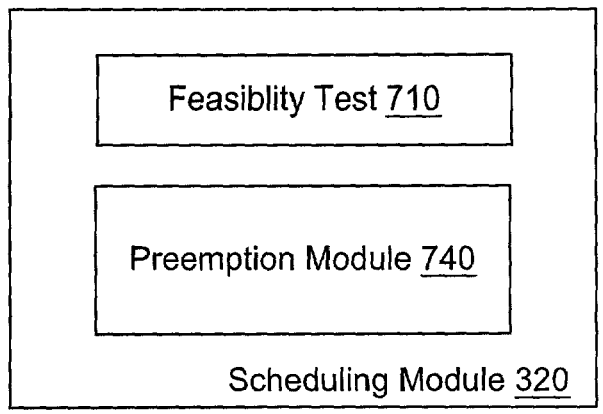
FIG. 7A is a block diagram of one embodiment of the admission control module of FIG. 3, according to the invention.

Further details of an embodiment of scheduling module 320 are illustrated in FIG. 7A. In this embodiment scheduling module 320 includes a feasibility test 710 and a preemption module 740. Feasibility test 710 receives the identities of a sender 220 (or intermediary 230) and a receiver 210, the size of the file to transfer, a maximum bandwidth receiver 210 can accept, a deadline, and information about available and committed bandwidth resources. Using this information feasibility test 710 determines if the transfer is "feasible" or "infeasible." A basic function of feasibility test 710 includes a comparison of the time remaining before the transfer deadline with the size of the file to transfer divided by the available bandwidth. In alternative embodiments this basic function is augmented by consideration of the total bandwidth that is already committed to other data transfers. Each of the other data transfers considered includes a file size and expected transfer rate used to calculate the amount of the total bandwidth their transfer will require.

Preemption module 740 is required in embodiments of the invention that support multiple levels of priority for data transfer requests. Preemption module 740 sorts the information at each node relating to resources committed to other data transfer requests by priority as assigned by priority module 370. If a data transfer request is rejected, preemption module 740 determines if the transfer could be accepted if a transfer with lower priority were preempted. If so, preemption module 740 also determines which previously accepted transfers should be rejected or delayed. Preemption module 740 finds lower priority requests that have been accepted and whose allocated resources are relevant to a new higher priority request. If a preempted request causes a previously accepted request to miss a deadline, the receiver of the previously accepted request is optionally notified. In one embodiment, preemption module 740 requires scheduling module 320 of receiver 210 to poll source nodes of accepted transfers for updates of the status of the accepted transfers. The scheduling module 320 of the source node replies with an OK message (no change in status), a DELAYED message (transfer delayed by some time t), or a CANCELED message.

Figure 7B:
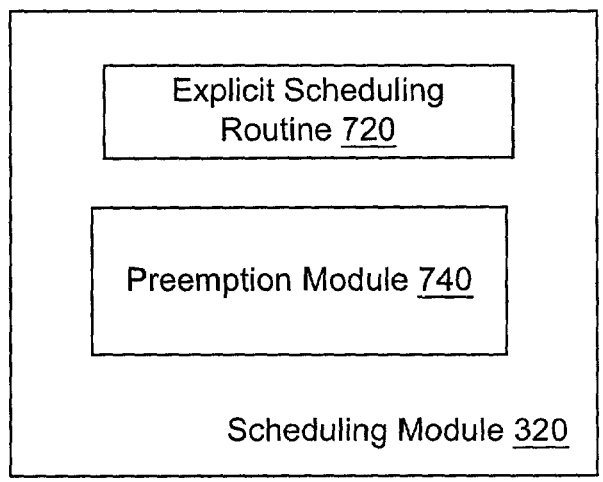
FIG. 7B is a block diagram of an alternative embodiment of the admission control module of FIG. 3, according to the invention.

As illustrated in FIG. 7B, an alternative to feasibility test 710 is explicit scheduling routine 720. Explicit scheduling routine 720 uses a detailed schedule of uncommitted space and bandwidth resources at its node. The detailed schedule includes, for example, available receive bandwidth and space as a function of time at receiver 210, and available transmit bandwidth as a function of time at sender 220. An embodiment of explicit scheduling routine 720 is illustrated by the following example. The scheduled resources are receive bandwidth, transmit bandwidth, and storage space. For each scheduled resource, each node (sender 220, receiver 210, and intermediary 230) is configured with a step function (a function $f$ with a constant value on each of a finite number of intervals, e.g., $f(x)=0$ for $x<0$, $f(x)=2$ for $0<=x<1$, and $f(x)=3$ for $1<=x<5$, $f(x)=1$ for $5<=x$) describing the total amount of the resource as a function of time. Other step functions, for example representing the amounts of resources allocated, resources available, and resources reserved, are maintained for each scheduled resource throughout the scheduling process. The total amount of resources is equal to the sum of the amount of resources allocated, the amount of resources available, and the amount of resources reserved.

In this example, when receiver 210 requests an object of size S from sender 220, receiver 210 sends a step function RBW to sender 220 representing the receive bandwidth available at receiver 210 between the time ($t_0$) of the request and the deadline ($t_1$) for the request. The integral of RBW from $t_0$ to $t_1$ must be greater than or equal to S for the request to be accepted. If scheduling module 320 at sender 220 grants the request, then sender 220 sends a step function TBW representing the planned bandwidth for the data transfer to receiver 210. The integral of TBW from $t_0$ to $t_1$ is equal to S and must be less than or equal to the minimum of RBW and ATBW, where ATBW is the available to transmit bandwidth at sender 220. As long as the integral of the minimum of RBW and ATBW from $t_0$ to $t_1$ is greater than or equal to S, it is possible to find a candidate step function TBW. There are many possible alternatives for TBW. A reasonable choice for the selection between alternative TBWs is the TBW that uses resources at as late a time as possible. This choice tends to leave early gaps in the schedules. However, because execution module 340 uses excess available resources to transfer data in advance of scheduled times, gaps in the schedules are filled as needed. If no requests with early deadlines are later made to fill these gaps, the transfers scheduled according to TBW are executed prior to their initial schedule. TBW must be consistent with space resources at receiver 210. In particular, the available space at receiver 210 must be greater than or equal to a step function that has value S in a time interval [$a_0$, $a_1$] and 0 elsewhere, where $a_0$ is the first time when TBW>0, and $a_1$ is the last time when there is a scheduled use of the requested object at receiver 210. In alternative embodiments of the invention, the selection of TBW is based on the cost of bandwidth. Several operations of explicit scheduling routine 720 make space versus bandwidth tradeoffs in scheduling the optimal use of limited resources.

Figure 7C:
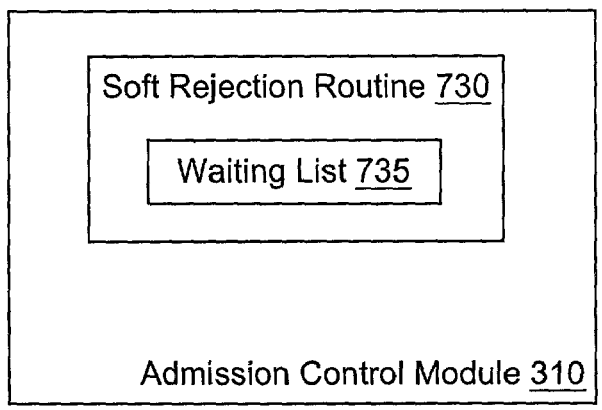
FIG. 7C is a block diagram of one embodiment of admission control module 310, according to the invention.

FIG. 7C is a block diagram of one embodiment of admission control module 310, according to the invention. Admission control module 310 includes, but is not limited to, a soft rejection routine 730. Soft rejection routine 730 handles a rejected scheduling request from scheduling module 320 and uses information about available resources at the node to suggest a deadline more likely to be accepted, to suggest a later time to make the original request (when some required resources are likely to be available), or to suggest a later deadline that will be accepted along with an offer to place the data transfer request on a waiting list 735 for the original deadline.

In one embodiment, soft rejection routine 730 at receiver 210 computes an earliest possible time that that node's part of the transfer could be completed by assuming the receive bandwidth is the maximum of receive bandwidth found in analyzing the request. Scheduling module 320 of receiver 210 then takes the minimum of all extra amounts of time reported by all nodes providing such information and generates a suggestion for a minimum time that should be added to the originally requested deadline. In selected embodiments padding is added to this minimum time. If the receive bandwidth available to a data transfer request is zero for a period during which sender 220 has available transmit bandwidth, but the available transmit bandwidth is less than the available receive bandwidth in a later period, then soft rejection routine 730 optionally suggests resubmitting the data transfer request after a period of time during which allocated transmit bandwidth has had an opportunity to be un-allocated through transfers that occur ahead of schedule. Under the same conditions, soft rejection routine 730 alternatively offers to place the data transfer request on waiting list 735.

Waiting list 735 is an optional component of soft rejection routine 730. Admission control module 310 uses waiting list 735 to accept previously rejected requests when a previously allocated resource is unexpectedly released (either because part of some request was executed early, or because some previously accepted request has been canceled). Waiting list 735 provides priority to requests that have been previously rejected. When enough resources become available, a request on waiting list 735 becomes "acceptable" and is allocated resources.

Returning to FIG. 3, routing module 330 identifies possible sources of the requested data. Embodiments of routing module 330 are located on intermediary 230 and receiver 210, and optionally on sender 220. Routing module 330 uses the location of receiver 210, identity of the requested data, locations of the requested data, network configuration, possible alternative senders 220, and information regarding previously allocated resources. Routing module 330 uses this information to generate a preferred source node or a prioritized list of preferred source nodes that optionally include one or more intermediaries 230.

In one embodiment, routing module 330 uses a combination of static configuration information and dynamic load balancing to choose a preferred source node. The statically configured information includes two lists for each node: a forward proxy list and a reverse proxy list. Either list can be empty. When receiver 210 wants data located at sender 220 and if receiver 210 has one or more forward proxies, then receiver 210 first tries to get the data from one of these forward proxies. If receiver 210 requests data from sender 220 and if sender 220 has any reverse proxies, then sender 220 optionally directs receiver 210 to redirect its request to one of these reverse proxies. For example, if intermediary 230 is a reverse proxy for sender 220, then after being redirected from sender 220 to intermediary 230, receiver 210 sends the request for data to intermediary 230, which then operates in a manner identical to sender 220. To avoid excess redirections, each routing module 330 keeps a table of redirections. When a redirection occurs, routing module 330 of receiver 210 adds an entry to its redirection table. The next time receiver 210 requests data from sender 220, routing module 330 of receiver 210 looks in its redirection table, and uses the added entry to determine that intermediary 230 is a possible alternative data source.

Embodiments of execution module 340 are required at every instance of transfer module 240 and use information stored at each node to manage the data transfers. This information includes a list of accepted node-to-node transfer requests, as well as information about resource reservations committed by scheduling module 320. Given the set of accepted requests, and a time interval, execution module 340 determines which data to send at what rate during that interval. Execution module 340 is responsible for transferring data at the desired rates. In one embodiment, execution module 340 uses methods as disclosed in the co-pending application entitled "System and Method for Controlling Data Transfer Rates on a Network." The operation of execution module 340 is responsive to the operation of scheduling module 320. For example, if scheduling module 320 constructed explicit schedules, then execution module 340 attempts to carry out the scheduled data transfers as close as possible to the schedule. Alternatively, execution module 340 is configured to perform data transfers as early as possible (ahead of schedule). If scheduling module 320 used feasibility test 710 to accept the data transfer request, then execution module 340 uses the results of those tests to prioritize the accepted requests. In either case, transfer module 240 is optionally configured to allow preemption of scheduled data transfers by later requests. Preemption module 740 changes the details of accepted transfers without compromising deadlines, causes deadlines to be missed, or alternatively rejects a request after it was originally accepted.

During execution of scheduled transfers, execution module 340 operates in discrete time intervals, called time slices, of length TS. During any time slice, execution module 340 determines how much data from each pending request should be transferred from sender 220 to receiver 210. Execution module 340 determines the rate at which the transfer should occur by dividing the amount of data to be sent by the length of the time slice TS. If scheduling module 320 uses explicit scheduling routine 720, then during any time slice there are a number of scheduled transfers planned to be in progress. There may also be transfers that were scheduled to complete before the current time slice, but which are running behind schedule. There may also be a number of dynamic requests receiving service, and a number of dynamic requests pending. Execution module 340 on each sender 220 apportions the available transmit bandwidth among all of these competing transfers. In some implementations, each sender 220 simply attempts to send the amount of data for each transfer determined by this apportionment. Similarly, execution module 340 on each receiver 210 may apportion the available receive bandwidth among all the competing transfers. In some implementations all control of transfer rates is done by receivers 210. In these implementations, the desired rates are set based on the amount of data apportioned to each receiver 210 by execution module 340 and the length of the time slice TS. In other implementations, both sender 220 and receiver 210 have some control over the transfer. In these implementations, sender 220 attempts to send the amount of data apportioned to each transfer by its execution module 340, but the actual amount of data that can be sent may be restricted either by rate control at receiver 210 or by explicit messages from receiver 210 giving an upper bound on how much data receiver 210 will accept from each transfer.

If scheduling module 320 uses explicit scheduling routine 720, the apportionment of available bandwidth to a scheduled transfer depends upon the details of the schedule for that transfer. In one embodiment, associated with a scheduled transfer T in progress is a completed through time (CTT) variable that serves as a pointer into the bandwidth schedule BW for T. For a time slice of length TS, execution module 330 will apportion B bytes to T, where B is the integral of BW from CTT to CTT+TS. At the end of the time slice, execution module 340 determines the number of bytes actually transferred, B', and then updates CTT to a new value CTT', where the integral from CTT to CTT' is B'. In another embodiment, execution module 340 apportions to T a planned transfer amount. If the time slice runs from t to t+TS, then execution module 340 apportions B bytes to T, where B is the integral of BW from t to t+TS. Execution module 340 also keeps track of the amount carried forward, CF, by which each transfer is behind schedule. At the end of the time slice, if the amount of data actually transferred is B', which is less than B, execution module 340 updates CF to a new value CF', where CF'=CF+B−B'. Any bandwidth not apportioned to scheduled transfers in this way may be applied to reducing CF for any transfers that are behind schedule. Execution module 340 also keeps track of which scheduled transfers have been started or aborted. Bandwidth that was planned to be used for transfers that have not started or that have been aborted is also available for apportionment among behind-schedule transfers and dynamic requests. Transfers may not start as scheduled either because space is not available at receiver 210 or because the data is not available at sender 220.

Execution module 340 uses a dynamic request protocol to execute data transfers ahead of schedule. One embodiment of the dynamic request protocol has four message types: DREQ(id, start, rlimit, Δt), DGR(id, rlimit), DEND_RCV (id, size), and DEND_XMIT (id, size, Δt). Each of these message types is defined below.

DREQ(id, start, rlimit, Δt) is a message from receiver 210 to sender 220 that requests that sender 220 send as much as possible of the scheduled transfer identified by id between times start and start+Δt at a rate less than or equal to rlimit. Receiver 210 must reserve rlimit bandwidth during the time interval start to start+Δt for use by this DREQ. The product of the reserved bandwidth, rlimit, and the time interval, Δt, must be greater than or equal to a minimum data size BLOCK. The value of start is optionally restricted to values between the current time and a fixed amount of time in the future. Sender 220 is not required to send a response. If no response (either message or data) is received by time start+Δt, then the DREQ expires.

DGR(id, rlimit) is a message from sender 220 to receiver 210 used to acknowledge a DREQ message. DGR notifies receiver 210 that sender 220 is planning to transfer data at a rate that is less than or equal to rlimit. The value of rlimit used in the DGR command must be less than or equal to the rlimit of the corresponding DREQ.

DEND_RCV(id, size) is a message from receiver 210 to sender 220 that informs sender 220 to stop sending data requested by a DREQ message with the same id, and that receiver 210 has received size bytes.

DEND_XMIT(id, size, Δt) is a message from sender 220 to receiver 210 that informs receiver 210 that sender 220 has stopped sending data requested by a DREQ message with the same id, and that size bytes have been sent. Receiver 210 does not make another DREQ request from this sender until Δt time has passed. The message DEND_XMIT(id, 0, Δt) is used as a negative acknowledgment of a DREQ message.

A transfer in progress and initiated by a DREQ message cannot be preempted by another DREQ message in the middle of a transmission of the minimum data size BLOCK. Resource reservations for data transfers are canceled when the scheduled data transfers are completed prior to their scheduled transfer time. The reservation cancellation is done each time the transfer of a BLOCK of data is completed.

If receiver 210 has excess receive bandwidth available, receiver 210 optionally sends a DREQ message to sender 220 associated with a scheduled transfer that is not in progress. Transfers not in progress and with the earliest start time are given the highest priority. In systems that include time varying cost functions for bandwidth, the highest priority transfer not in progress is optionally the one for which moving bandwidth consumption from the scheduled time to the present will provide the greatest cost savings. The receiver does not send a DREQ message unless it has space available to hold the result of the DREQ message until its expected use (i.e. the deadline of the scheduled transfer).

If sender 220 has transmit bandwidth available, and has received several DREQ messages requesting data transfer bandwidth, the highest priority DREQ message corresponds to the scheduled transfer that has the earliest start time. The priority of DREQ messages for transfers to intermediate local storages are optionally higher than direct transfers because completing these transfers early will enable the completion of other data transfers from intermediary 230 in response to DREQ messages. While sending the first BLOCK of data for some DREQ, sender 220 updates its transmit schedule and then re-computes the priorities of all pending DREQ's. Similarly, receiver 210 can update its receive schedule and re-compute the priorities of all scheduled transfers not in progress.

Slack module 350 uses the total available resources on each node involved in a data transfer and historical information about resource demand as a function of time to reserve resources at each node along a transfer path. The reservations include an excess of resources designed to allow for expected variations in transmission rates. The amount of excess resources reserved is optionally based on statistical models of the historical information.

In one embodiment slack module 350 reserves a fixed percentage of all bandwidth resources (e.g. 20%). In an alternative embodiment slack module 350 reserves a larger fraction of bandwidth resources at times when transfers have historically run behind schedule (e.g., between 2 and 5 PM on weekdays). The reserved fraction of bandwidth is optionally spread uniformly throughout each hour, or alternatively concentrated in small time intervals (e.g., 1 minute out of each 5 minute time period).

Padding module 360 uses the identities of sender 220 and receiver 210, a size of the data to be transferred, a maximum bandwidth expected for the transfer, and historical information about achieved transfer rates to calculate an excess time "P." P is added to the estimated data transfer time as "padding" before scheduling module 320 qualifies a requested data transfer as acceptable. The added time P is chosen such that the probability of completing the transfer before the deadline is above a specified value.

In one embodiment of padding module 360, P is set equal to the maximum of MIN_PAD and PAD_FRACTION times the scheduled transfer time, where MIN_PAD and PAD_FRACTION are constants such as 15 minutes and 0.25 respectively. In alternative embodiments MIN_PAD and PAD_FRACTION are varied as functions of time of day, sender-receiver pairs, or historical data. For example, in one embodiment, if a scheduled transfer spans a 2 PM–5 PM interval, MIN_PAD is increased by 30 minutes. In another embodiment, P is set to ABS_PAD+FRAC_PAD_TIME. ABS_PAD is a small fixed time (e.g., 5 seconds) and FRAC_PAD_TIME is the time required to transfer B bytes, where B is PAD_FRACTION times the size of the requested data file. In this embodiment available bandwidth is taken into account when FRAC_PAD_TIME is computed from B.

Priority module 370 is included in embodiments of transfer module 240 that support multiple priority levels. Priority module 370 uses information about a request (requesting node, source node, file size, deadline), information about levels of service available at the requesting node and the source node, additional information about cost of bandwidth, and a requested priority level for the data transfer. Priority module 370 uses this information to determine if a higher priority request can preempt an already scheduled (accepted) lower priority request.

In one example, receiver 210 requests a file from a source node with a very tight deadline. The request could rejected because (1) all transmit bandwidth at the source node has already been allocated, (2) the tight deadline does not leave room for padding, or (3) additional transmit bandwidth at the source node during the time interval in question has a premium price. Priority module 370 gives the user requesting the data transfer an option of paying a higher price to assign a higher priority to the transfer. If the user accepts this option, the request has a higher priority and has a greater chance of being accepted. If the original request was rejected because all transmit bandwidth at the source node was already allocated, acceptance of the data transfer request requires preemption of one or more previously accepted transfers from the source node. If the original request was rejected because there was no room for padding, the high priority of the transfer allows it to borrow resources from other transfers at the time of execution in order to meet the deadline. If the original request was rejected because of the premium price of additional bandwidth, then the amount paid by the user allows the use of expensive bandwidth that would not otherwise be used.

Error recovery module 380 manages recovery from transfer errors. Since a significant part of network 140 is beyond direct control, transfer module 240 must be able to respond to a failure of any element along a transfer path. If a failure occurs, connections are dropped, data transfers halt, and/or schedule negotiations timeout. Error recovery module 380 maintains a persistent state at each node, and the node uses that state to restart after a failure. Error recovery module 380 also minimizes the amount of extra data transferred in completing interrupted transfers and the number of accepted requests that are canceled as a result of failures and timeouts. Data is stored in each node regarding requests accepted by scheduling module 320, resource allocation, the state of each transfer in progress, waiting lists 735 (if these are supported), and any state required to describe routing policies (e.g., proxy lists). Error recovery module 380 uses this information to restart data transfers at each node.

Error recovery module 380 maintains a persistent state in an incremental manner. For example, each time a new request is accepted or an old request is preempted, or a DREQ transfers data of size BLOCK, data stored by error recovery module 380 is updated with a simple, fast transaction. In one embodiment, the persistent state for each sender 220 includes a description of the allocated transmit bandwidth for each accepted request, plus a summary of each transmission completed in response to a DREQ. The persistent state for each receiver 210 includes a description of the allocated receive bandwidth and allocated space for each accepted request, plus a summary of each data transfer completed in response to a DREQ. At regular intervals, the persistent state data is reduced by eliminating all requests and DREQs for transfers that have already been completed and whose deadlines are in the past.

Figure 8A:
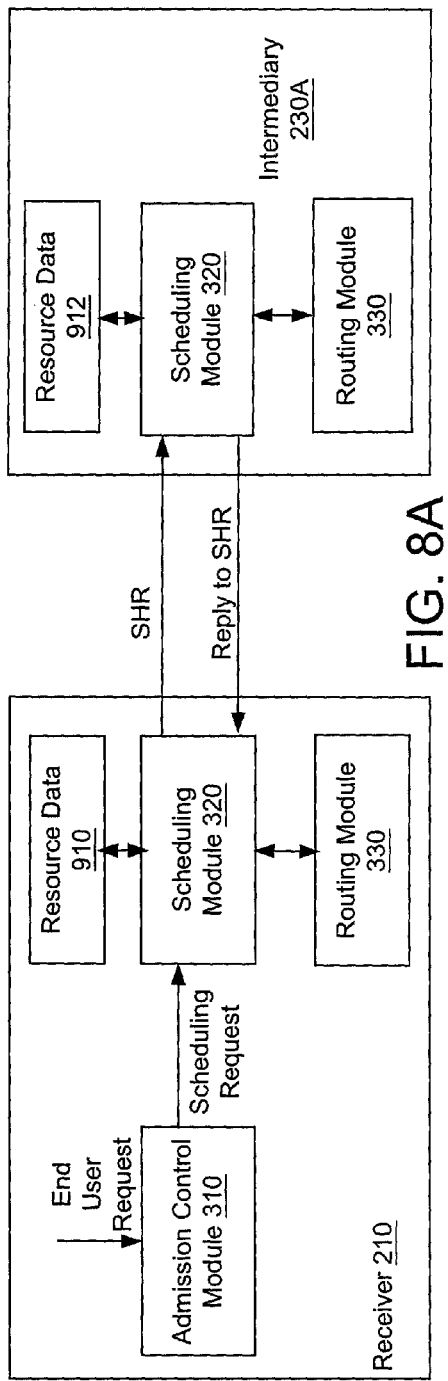
FIG. 8A is a diagram of processing of a request for a data transfer according to one embodiment of the invention.

FIG. 8A is a diagram of processing of a request for a data transfer according to one embodiment of the invention. An end user at receiver 210 submits a request to admission control module 310. In the FIG. 8A embodiment, receiver 210 is a personal computer that the end user interacts with directly; however, in another embodiment receiver 210 is a gateway device that the end user interacts with via another device, such as a personal computer or handheld device such as a personal digital assistant. The request includes the identity of the data, an earliest deadline, a latest deadline, and a minimum time available. The earliest deadline is the earliest time that the user wants to be able to access the data. The latest deadline is the latest time that the user can accept the data. The earliest deadline and the latest deadline define a deadline window. The minimum time available is the minimum length of time after the data arrives during which the data must remain available to the user in local storage 170 (FIG. 2). For purposes of discussion, in FIG. 8A the user requests a movie with an earliest deadline of Friday 6 PM, a latest deadline of Sunday 6 PM, and a minimum time available of twenty-four hours so that the user can view the movie some time during the weekend.

After receiving the request, admission control module 310 sends a scheduling request to scheduling module 320, requesting the movie with a deadline of Friday 6 PM. Each scheduling request includes the identity of the requested data and a deadline. The initial scheduling request from admission control module 310 typically includes the earliest deadline selected by the user. Scheduling module 320 first determines whether the movie is available in local storage 170 of receiver 210. In this example, the movie is not available in local storage 170, so scheduling module 320 asks routing module 330 to identify possible sources for the movie. Routing module 330 identifies two source nodes for the movie, intermediary 230A, which is a forward proxy of receiver 210, and sender 220. Scheduling module 320 of receiver 210 also queries resource data 910 to determine if receiver 210 will have enough receive bandwidth to receive the movie by the deadline window and enough storage space to store the movie for the requested amount of time.

In this example, receiver 210 will have adequate receive bandwidth, so scheduling module 320 of receiver 210 sends a single hop request (SHR) to scheduling module 320 of intermediary 230A, indicating the movie and a deadline of Friday 6 PM. Each single hop request includes the identity of the requested data and a deadline. Scheduling module 320 of intermediary 230A evaluates the single hop request in view of its resource data 912 and determines that there will not be enough transmit bandwidth available at intermediary 230A until Friday at 1 PM and that intermediary 230A cannot complete the requested transfer by Friday 6 PM. Scheduling module 320 of intermediary 230A replies to the single hop request with a denial and a suggestion of a probable later deadline, Saturday 6 AM.

Figure 8B:
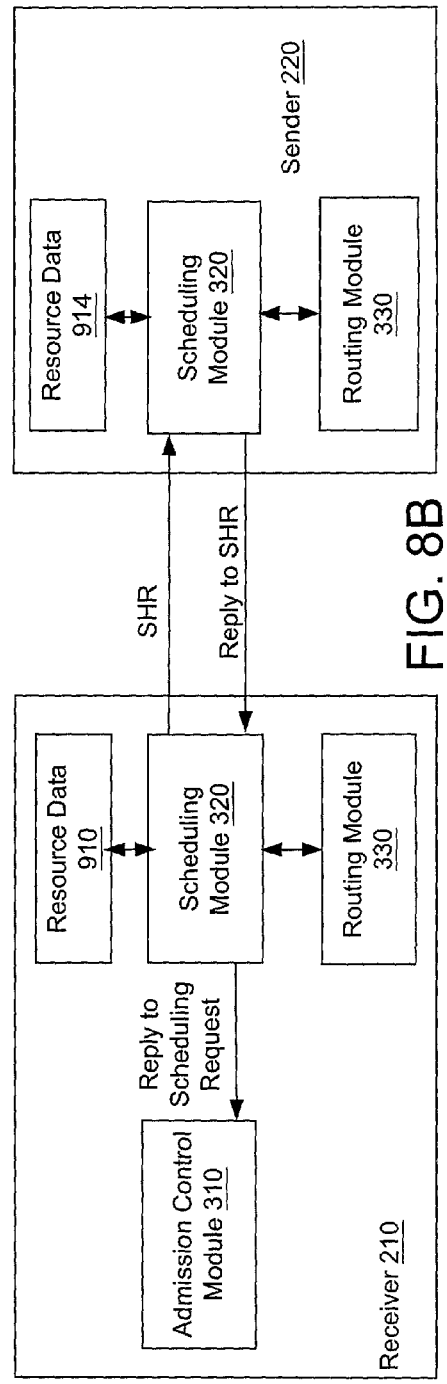
FIG. 8B is a diagram of further processing of a request for a data transfer according to one embodiment of the invention.

FIG. 8B is a block diagram of further processing of a request for a data transfer, according to one embodiment of the invention. After receiving a denial of the initial single hop request with the earliest deadline, scheduling module 320 of receiver 210 sends a single hop request with the earliest deadline to the other source identified by routing module 330 of receiver 210, sender 220. Scheduling module 320 of sender 220 evaluates the SHR in view of its resource data 914, such as transmit bandwidth, and determines that the movie cannot be delivered to receiver 210 by the deadline, which is the earliest deadline of Friday 6 PM. Scheduling module 320 of sender 220 sends a reply to the SHR to receiver 210, denying the SHR and suggesting a later deadline of Monday 9 AM. Scheduling module 320 on receiver 210 compares the two replies and determines that the reply from intermediary 230A has an earlier deadline. Scheduling module 320 sends a reply to admission control module 310, denying the initial SHR from admission control module 310 and suggesting an alternative deadline of Saturday 6 AM.

FIG. 8C is a diagram of further processing of a request for a data transfer according to one embodiment of the invention. Admission control module 310 determines that a deadline of Saturday 6 AM is within the original deadline window input by the end user (later than the earliest deadline but earlier than the latest deadline), and so admission control module 310 sends another scheduling request to scheduling module 320, requesting the movie with a deadline of Saturday 6 AM. Scheduling module 320 of receiver 210 sends the SHR to intermediary 230A. Scheduling module 320 of intermediary 230A evaluates this SHR in view of its resource data 912 and determines that the SHR is likely to be fulfilled in view of storage space and bandwidth at intermediary 230A, but that intermediary 230A currently does not have the movie in its local storage 160 (FIG. 2). Scheduling module 320 of intermediary 230A then queries routing module 330 of intermediary 230A for possible source nodes for the movie. Routing module 330 replies with two possible sources, an intermediary 230B and sender 220.

FIG. 8D is a diagram of further processing of a request for a data transfer according to one embodiment of the invention. If intermediary 230A receives the movie, it will start sending the movie to receiver 210 at Friday 1 PM, so scheduling module 320 of intermediary 230A sends a SHR to intermediary 230B with a deadline of Friday 1 PM. In this example, intermediary 230B is already expecting to receive the movie from sender 220 on Wednesday at 4 PM. Scheduling module 320 of intermediary 230B evaluates the SHR in view of resource data 916, and determines that intermediary 230B can easily send the movie to intermediary 230A between Wednesday 4 PM and Friday 1 PM. So scheduling module 320 of intermediary 230B replies to the SHR with an acceptance of the request to send the movie to intermediary 230A by Friday 1 PM.

Figure 8E:
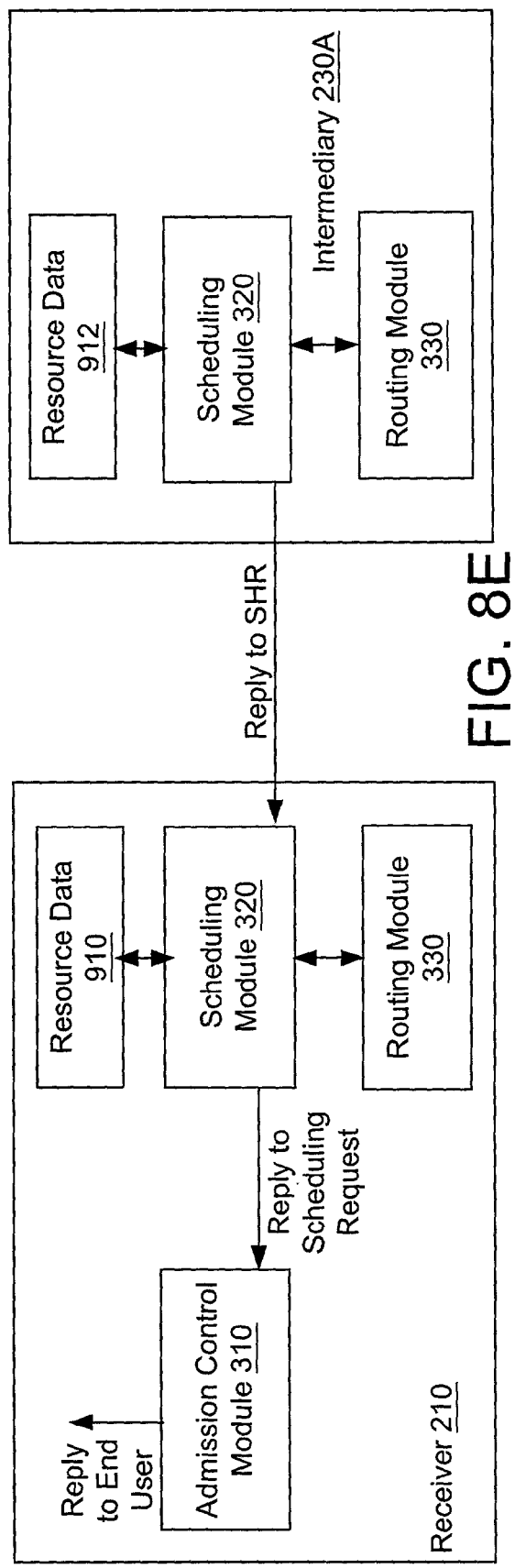
FIG. 8E is a diagram of further processing of a request for a data transfer according to one embodiment of the invention.

FIG. 8E is a diagram of further processing of a request for a data transfer according to one embodiment of the invention. After receiving the acceptance from intermediary 230B, scheduling module 320 of intermediary 230A replies to receiver 210 with an acceptance of the SHR to send the movie to receiver 210 by Saturday 6 AM. Scheduling module 320 of receiver 210 then replies to admission control module 310 with an acceptance of the scheduling request for the movie with a deadline of Saturday 6 AM, and reserves adequate space in local storage 170 to store the movie for at least twenty-four hours after it arrives. Admission control module 310 then replies to the end user with an acceptance of the original request, indicating that the movie will arrive by Saturday 6 AM and that it will be available in local storage 170 until Sunday 6 AM. Thus, the user will be able to access the movie anytime between Saturday 6 AM and Sunday 6 AM.

In the example described above in conjunction with FIGS. 8A–8E, the requested data (movie) is transferred from sender 220 to intermediary 230B, from intermediary 230B to intermediary 230A, and from intermediary 230A to receiver 210. Each node evaluates a single hop request between itself and another node in view of the node's resources, such as receive bandwidth, transmit bandwidth, and available storage space.

Although the embodiment discussed above in conjunction with FIGS. 8A–8E is a distributed system, a centrally-controlled system is within the scope of the invention. In one embodiment, a central control node, for example a server, includes transfer module 240 as shown in FIG. 3. Transfer module 240 of the central control node evaluates each request for data transfers between nodes in communication network 200 in accordance with resources at each node. Transfer module 240 of the central control node also manages the execution of scheduled data transfers and dynamic requests. Transfer module 240 of the central control node periodically interrogates (polls) each node to ascertain the node's resources, such as bandwidth and storage space, and then uses this information to determine whether a data transfer request should be accepted or denied. In this embodiment, transfer module 240 of the central control node includes most of the software required to schedule and execute data transfers, such that the amount of software needed at the other nodes in communication network 200 is relatively less. In another embodiment, multiple central control devices are implemented in communication network 200.

The invention has been explained above with reference to specific embodiments. Other embodiments will be apparent to those skilled in the art in light of this disclosure. For example, the present invention is readily implemented using configurations other than those described in the embodiments above. Additionally, the present invention is effectively used in conjunction with systems other than those described above. Therefore, these and other variations upon the disclosed embodiments are intended to be covered by the present invention, which is limited only by the appended claims.

We claim:

1. A method for scheduling a data transfer over a network, comprising the steps of:

identifying a data file and a deadline window for delivery of the data file to a receiver;

sending the identity of the data file and the deadline window to an admission control module at the receiver, the admission control module being configured to prepare a scheduling request that includes the identity of the data file and a deadline within the deadline window;

sending the scheduling request to a scheduling module of the receiver;

querying a routing module at the receiver to identify a possible source node for the data file;

sending a single hop request from the scheduling module of the receiver to a scheduling module of the possible source node, the single hop request including the identity of the data file and the deadline;

evaluating the single hop request by the scheduling module at the possible source node, where the single hop request is evaluated in view of the size of the data file, the deadline, and available transmit bandwidth at the possible source node;

sending a reply to the single hop request to the scheduling module of the receiver indicating whether the single hop request is accepted or denied by the possible source node; and if the single hop request is accepted, reserving resources at the receiver, reserving resources at the possible source node, scheduling a time to begin transferring the data file from the possible source node to the receiver, and sending a reply to the scheduling request to the admission control module.

2. The method of claim 1, wherein if the single hop request is denied, the scheduling module of the receiver sends another single hop request to another possible source node identified by the routing module.

3. The method of claim 1, wherein if the single hop request is denied, the reply to the single hop request includes a suggestion for an alternate deadline for delivery of the data file to the receiver.

* * * * *